United States Patent [19]

Lamy

[11] 4,183,697

[45] Jan. 15, 1980

[54] LAYING OF UNDERWATER PIPELINES

[75] Inventor: Jacques E. Lamy, Fontenay-aux-Roses, France

[73] Assignee: Compagnie Generale pour les Developpements Operationnels des Richesses Sous-Marines "C.G. DORIS", Paris, France

[21] Appl. No.: 882,747

[22] Filed: Mar. 2, 1978

Related U.S. Application Data

[62] Division of Ser. No. 757,098, Jan. 5, 1977, Pat. No. 4,096,705.

[30] Foreign Application Priority Data

Jan. 27, 1976 [FR] France .................................. 76 02135

[51] Int. Cl.² ............................................. F16L 1/04
[52] U.S. Cl. .................................... 405/170; 405/171
[58] Field of Search ................. 61/107, 109, 110, 111, 61/112, 113, 114; 114/253; 405/158, 168, 169, 170, 171

[56] References Cited

U.S. PATENT DOCUMENTS

| 3,568,456 | 3/1971 | Van Loenen | 61/112 |
| 4,051,687 | 10/1977 | Ells | 61/114 |

FOREIGN PATENT DOCUMENTS 1434357  5/1976  United Kingdom ...................... 61/112

Primary Examiner—Mervin Stein
Assistant Examiner—Alexander Grosz
Attorney, Agent, or Firm—Laurence R. Brown

[57] ABSTRACT

For laying a pipeline on the bed of the sea, a plurality of pipeline sections are successively towed by a tug exerting a traction effort at a point spaced to the rear of the front end of a pipeline section being towed, while another tug exerts a holding effort at a point spaced in front of the rear end, the front and rear ends being maintained near to the surface by a system of floats and trail-ropes and the intermediate portion of the pipeline section being ballasted so as to be supported on the sea bed, whereafter the front end of the pipeline section is welded to the rear end of a preceding section, and so on.

5 Claims, 9 Drawing Figures

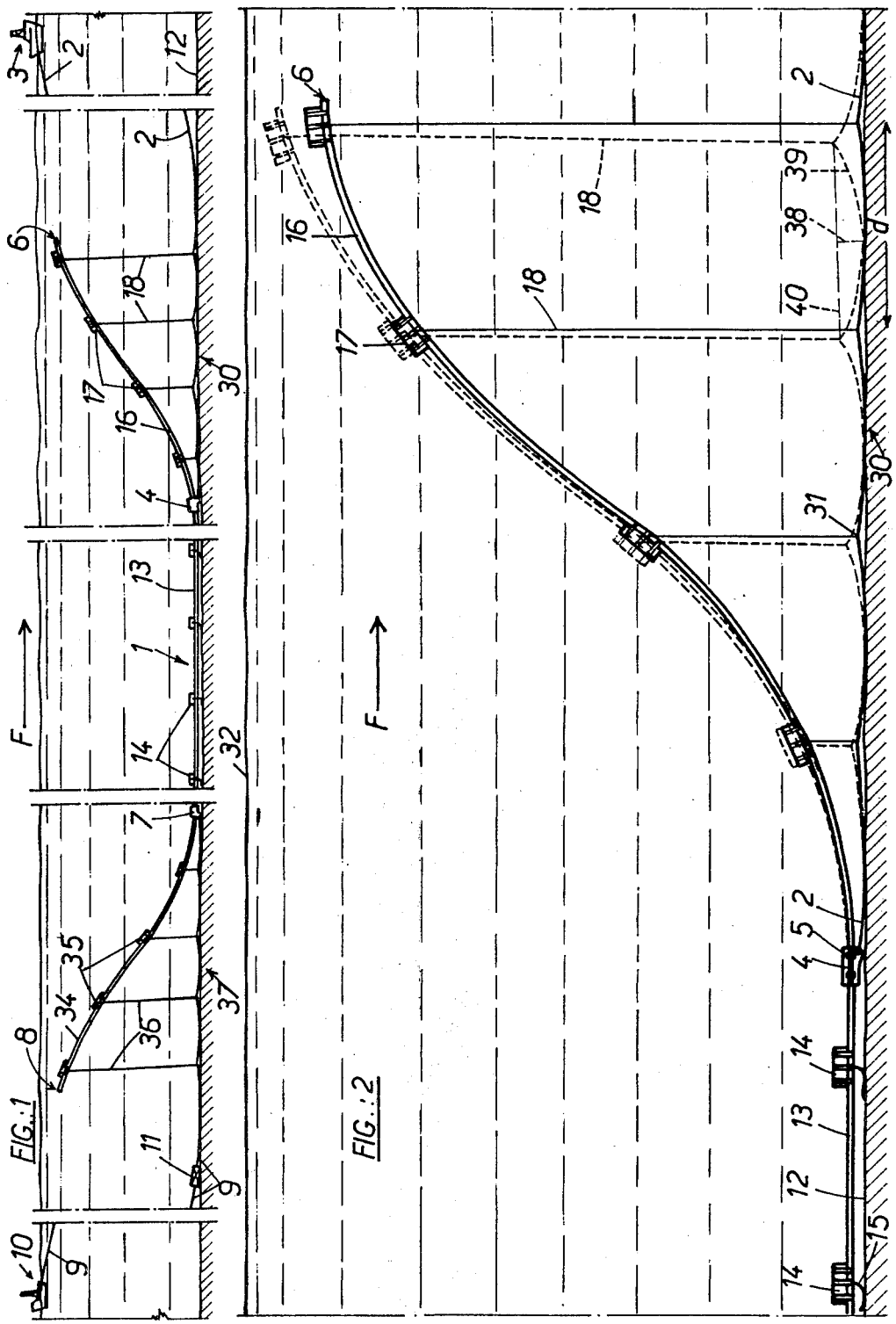

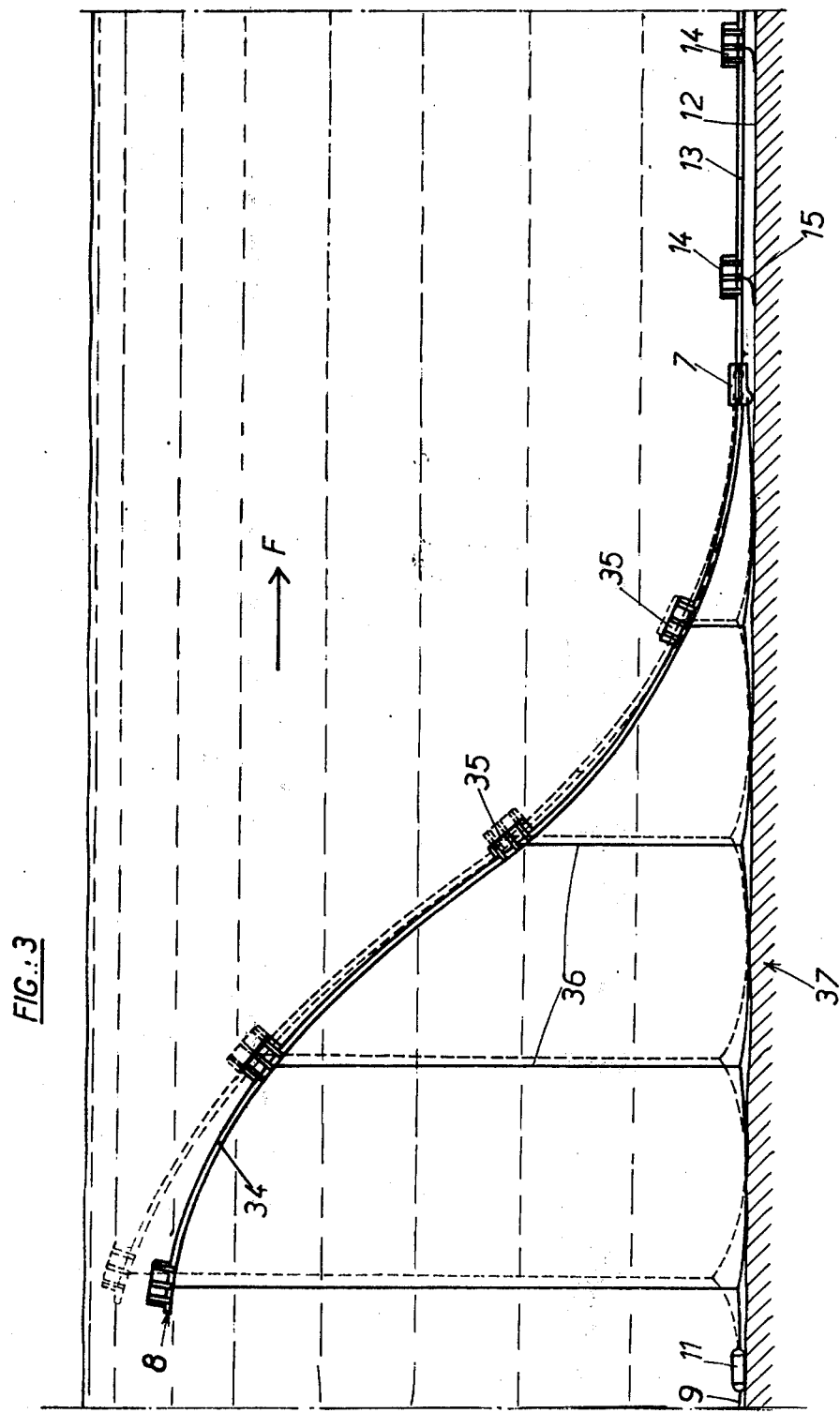

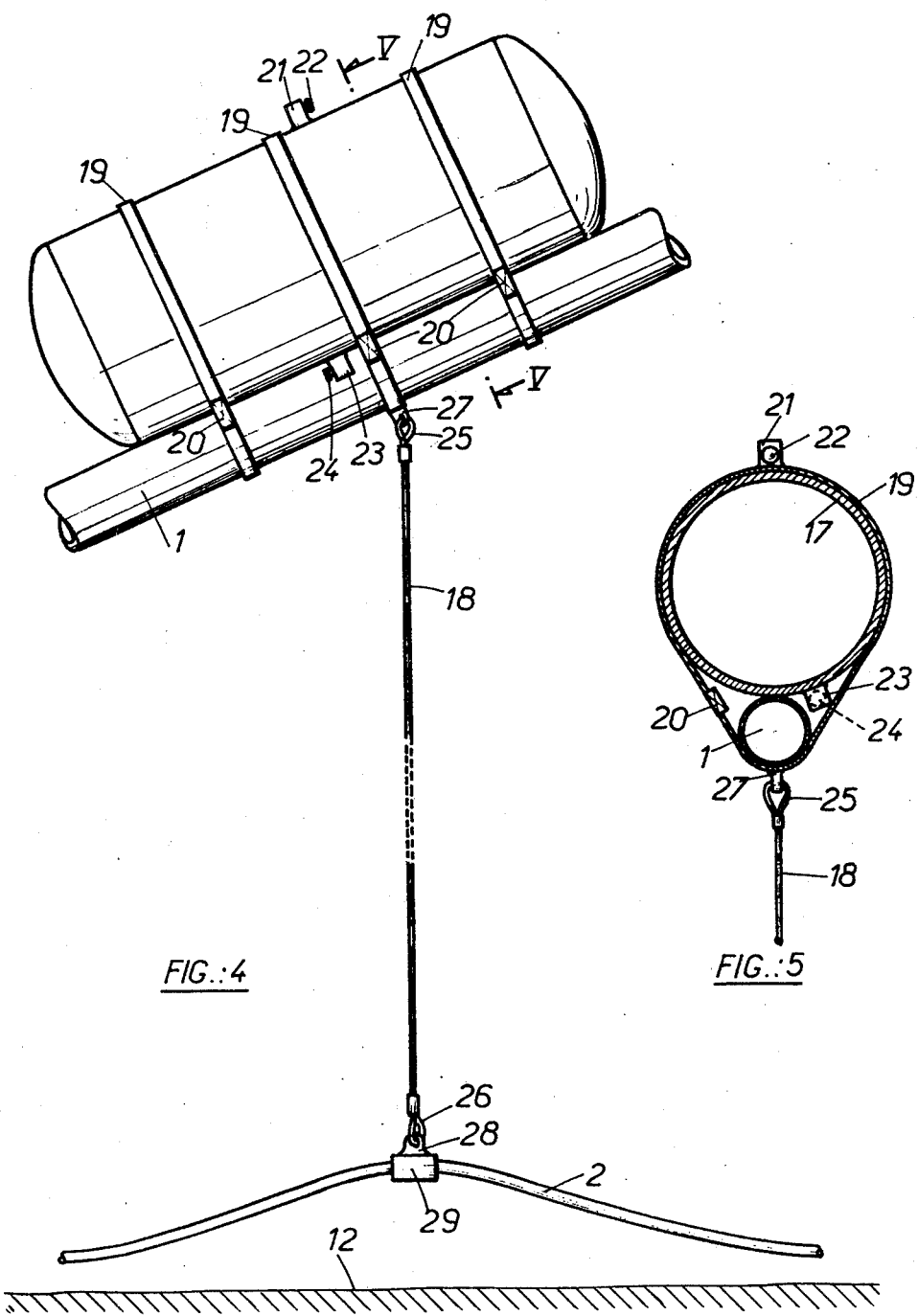

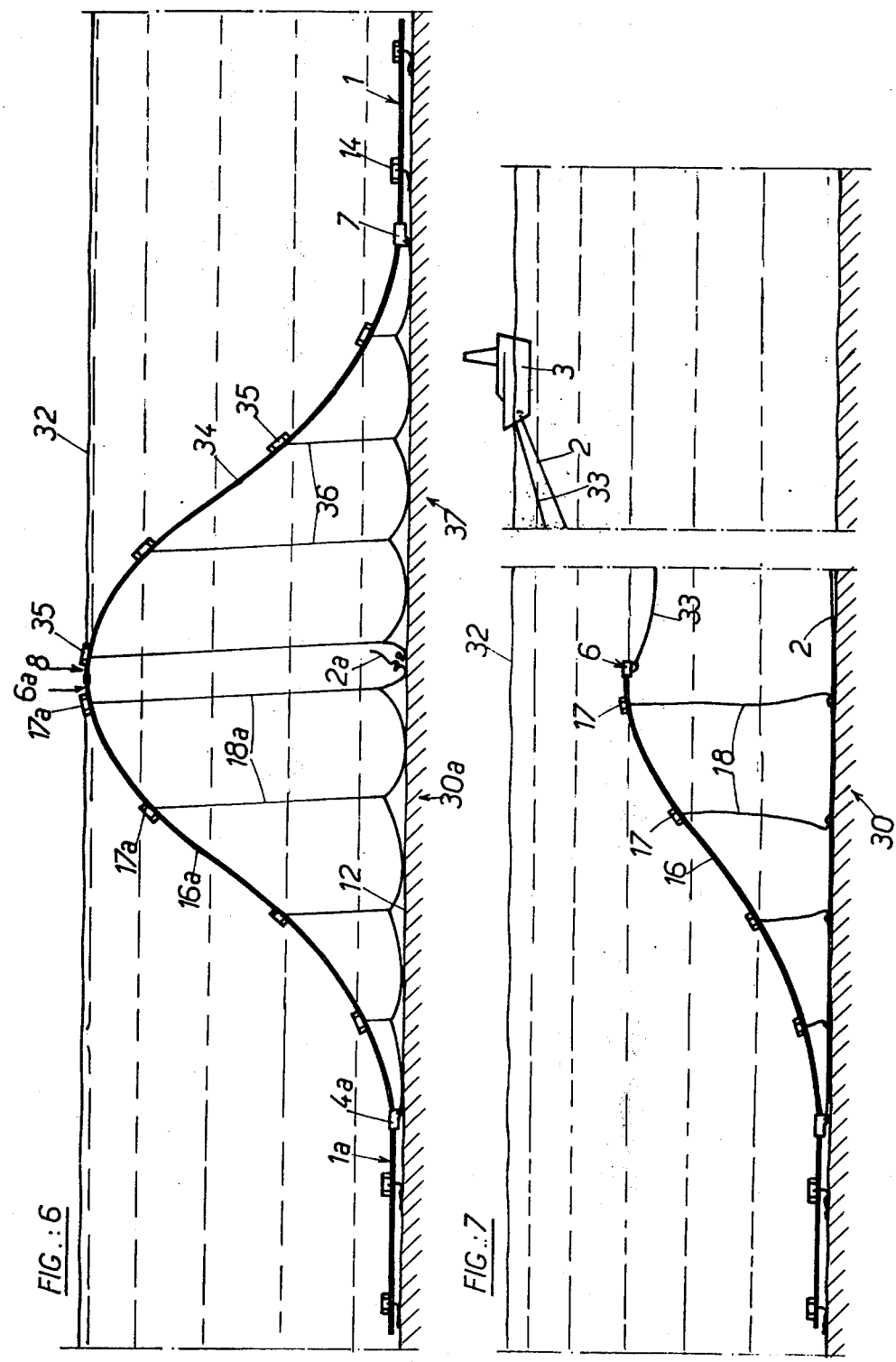

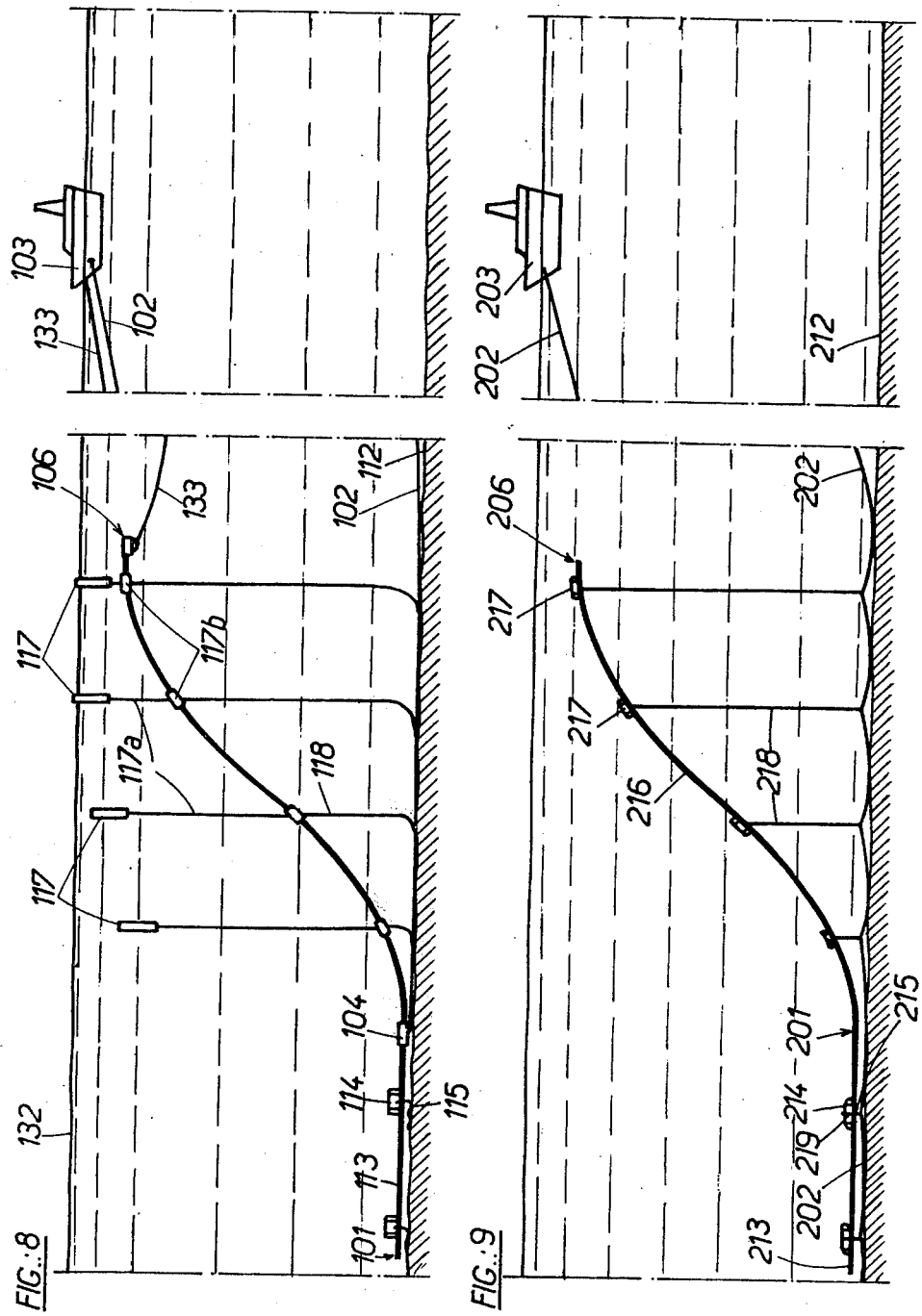

LAYING OF UNDERWATER PIPELINES

This is a division, of application Ser. No. 757,098, filed Jan. 5, 1977 now U.S. Pat. No. 4,096,705 issued June 27, 1978.

This invention relates to the laying, on the bed of the sea or of a body of water, of a pipeline intended, for example, to serve as an oil duct or a gas duct, and is particularly concerned with the laying of very long pipelines.

It is known to draw from the shore to the open sea a pipeline progressively increasing in length composed of units, initially stored on land, which are successively added to the rear end, still on the shore, of the portion of the pipeline already submerged. The pipeline units themselves consist of a certain number of pipes assembled together end-to-end and capable of being of considerable length of the order of 1 km or even more. The assembly of the tubes to each other and the assembly of the elements to the rear end of the pipeline can easily be effected by welding, provided this is carried out on land.

It is also known to give the pipeline, while it is being laid, a slightly positive buoyancy and to equip it, in various positions, with chains or cables resting on the sea bed and acting as trail-ropes. The pipeline is thus held in equilibrium near to the bed by the system of trail-ropes and possibly by floats which give it a tendency to rise if it does not itself have a positive buoyancy. One can thereby tow lengths of tubes of several kilometers, their length being limited solely by the pulling force necessary to overcome the friction of the trail-ropes on the bed. This friction is obviously less than that which it would be necessary to overcome if the previously ballasted pipeline were dragged directly on the bed, but it can be relatively high if it is necessary to provide trail-ropes sufficiently heavy to prevent the pipeline deviating under the action of rapid transverse currents.

It is in fact possible to exert very great pulling forces, either by means of tugs or by means of winches located on barges anchored to the sea bed. For example, one can effect towages over sufficiently long distances by means of tugs exerting pulling efforts of the order of 200 to 300 tons but that involves considerable expense. In any event, there is obviously a limit to the length of pipeline that can be towed; there is no question of towing lengths of pipeline exceeding several tens of kilometers, while one can now envisage the laying of pipelines of several hundreds of kilometers. It is thus necessary to consider effecting the joining of pipes at sea. It is not impossible to carry out such joining on the sea bed since apparatus exists which would permit welding at a certain depth, for example by means of caissons or diving bells, and since a pipe maintained in equilibrium by a system of trail-ropes is easier to handle than a pipe resting heavily on the sea bed. However, the devices for welding at depth are very expensive and take a long time to get into operation.

The present invention overcomes these disadvantages by enabling welding operations to be carried out on or very near to the surface. The joints can thus be effected easily, rapidly and cheaply. An additional advantage is that it is no longer necessary to contemplate towing very long sections of pipeline so that there can be considerable economy in towing costs.

According to the invention, the pipeline sections are towed while maintaining their front and rear ends on or near the surface and the remainder near the bed, and then the rear end of each section is connected to the front end of the preceding section. One can then allow the welded ends to descend to the sea bed.

According to one embodiment, one exerts pulling and holding forces at points situated respectively a certain distance from the front and rear ends of a pipeline section being towed, by means of tugs acting respectively as a towing machine and a holding machine; the end portions of the pipeline section, i.e. the portions situated respectively in front of and behind these two points are connected respectively to the two machines and are provided with means, such as floats, which give them a positive buoyancy, and preferably with systems of trail-ropes, so as to maintain the ends of said pipeline section on or near the surface.

According to another embodiment, the principal portion of the pipeline section, i.e. that comprised between the front and rear end portions, is connected at a plurality of positions, by means of suspenders, to a traction distribution cable extending right along the pipeline section and of which the two ends are connected respectively to a pulling machine and a holding machine. As in the embodiment described in the preceding paragraph, the front and rear end portions are connected respectively to these two machines and provided with devices to give them a positive buoyancy, and preferably with trail-rope systems.

One can thus, for example, after having towed a first section of pipeline towards the open sea, progressively as one constructs it by the addition of successive sections to its rear end, while maintaining its front end near the surface, fix this front end to a dead weight while one tows towards the open sea a pipeline section constructed in the same way and then tow it while maintaining its front and rear ends near to the surface until this rear end is located near the front end of the first section, then cause the two adjacent ends to rise to the surface, for example by pumping air into their floats, join them together by welding the loop thus formed and finally allow the latter to descend to the bed, for example by ballasting their floats and by controlling its descent by means of a cable exerting on it a lateral traction to avoid the application of excessive constraints to the pipeline. One can then proceed in the same manner for a third section, and so on.

The following description, with reference to the attached drawings, given as non-limiting examples, will enable the advantages of the invention and the manner of carrying it into effect to be better understood, all particulars both in the text and the drawings, coming, it will be understood, within the scope of said invention.

FIG. 1 is a diagrammatic side view of a pipeline section in the course of being towed.

FIGS. 2 and 3 are views similar to FIG. 1, showing on a larger scale the front and rear portions, respectively, of the pipeline section.

FIG. 4 is a partial side view, again on a larger scale, illustrating the action of the floats.

FIG. 5 is a section on the line V—V of FIG. 4.

FIG. 6 is a view similar to FIGS. 2 and 3, showing the junction of two pipeline sections.

FIG. 7 is a view similar to FIG. 2, showing how the ends of a pipeline section can be located to resist a storm.

FIG. 8 is a view similar to FIG. 2, showing another embodiment.

FIG. 9 is a view similar to FIG. 2, showing yet another embodiment.

As shown in FIGS. 1 to 3, a pipeline section 1 is being towed in the sea, in the direction of the arrow F, by means of a towing cable 2 drawn by a tug 3 and fixed to a traction head 4 formed by a collar tightened by bolts around the pipeline section a certain distance from its front end 6. Another collar 7, gripping in a similar manner the pipeline section at a certain distance from its rear end 8, is fixed to one end of a holding cable 9 of which the other end is attached to a small tug 10 which exerts a certain pulling force thereon such that the pipeline section 1 is maintained lightly in tension and does not risk forming S-bends or buckles on the sea bed. The holding cable 9 is furthermore provided, to the rear of the end 8 of the pipeline section, with a heavy block 11 forming a drag which rubs on the sea bed 12. The principal portion 13 of the pipeline section, which is comprised between the collars 4 and 7, is equipped in known manner with a system of floats 14 which give it a slightly positive buoyancy and with chains or cables 15 which drag on the bottom 12 and act as aerostatic trailropes. The principal portion 13 of the pipeline section is thus maintained slightly above the bed 12.

The front end portion 16 of the pipeline section, i.e. the portion situated in front of the traction head 4, is provided with a plurality of floats 17 distributed along its length and each connected by a suspender to the towing cable 2. The arrangement of one of these floats and its suspension is shown in more detail in FIGS. 4 and 5. The float 17 shown in these figures consists of a drum having a diameter greater than that of the pipeline section and held against the upper surface thereof by hoops 19 consisting of metal bands and provided with pyrotechnic rupture devices 20. To one of these hoops is attached one end of a suspender 18 the other end of which is fixed to the towing cable 2. The float is provided on its upper part with a tube 21 normally closed by a cock 22 and on its lower part with a tube 23 normally closed by a cock 24. This arrangement enables the buoyancy of the float to be regulated as required; to weight it, it suffices to open temporarily the cock 24 and possibly also the cock 22 in order to allow a certain quantity of water to enter the float, and to lighten it, it suffices to connect the tube 21 to a source of compressed air and open temporarily the cocks 22 and 24 in order to discharge a certain quantity of water from the float. These operations can easily be carried out by divers provided with bottles of compressed air.

The suspender 18 is provided at its ends with welded buckles 25 and 26 which engage respectively an eyelet 27 welded to one of the hoops 19 and an eyelet 28 carried by a sleeve 29 fitted on the cable 2. The floats 17 are controlled so that the assembly of floats 17, the front end portion 16, the suspenders 18 and the portion 30 of the towing cable situated facing, has a slightly negative buoyancy, the portion 16 of the pipeline floating between two waters and ballasting being assured by the weight of the cable 2 and the suspenders 18, the latter being stretched and the cable 2 resting on the bed 12 in its parts situated between them and forming a sort of festoon.

The towing cable 2 should be sufficiently strong to pull the pipeline section the length of which, as has already been indicated, could be as much as several kilometers. The cable 2 is thus very heavy and drags on the bed 12 in front of its portion 30. In the towing position shown in FIG. 1 and in full lines in FIG. 2, i.e. when the tug 3 pulls on the cable 2, the traction force applied to the front end of the portion 30 of this cable is thus practically horizontal and tends to straighten the portion 30 (i.e. to give it a rectilinear configuration) against the action of the suspenders 18 which pull the peaks 31 of the festoon upwards so that the latter is little accentuated. The lengths of the suspenders are chosen such that the pipeline section 16 forms, in the towing position, a curve such as that shown, placing the end 6 several meters (for example 7 to 8 meters) below the surface 32 of the sea, in order to protect this end against the effect of swell during towing, with radii of curvature large enough not to impose excessive flexing strains on the pipeline. The suspenders 18 form with the part 30 of the cable a system of trail-ropes which co-operates with the floats 17 to absorb the towing shocks and maintain the pipeline section 16 in stable equilibrium.

As soon as the tug 3 stops pulling on the towing cable 2, the stretching force, which opposes the action of the suspenders 18 drawing the peaks 31 of the festoon upwards, is no longer generated except by rubbing of the cable 2 on the bed 12. In the embodiment shown, it is assumed that the weight of the cable is not too great, so that its rubbing on the bed does not prevent sufficient sliding to allow the floats 17 to lift the pipeline section 16 to a rest position shown in broken lines in FIG. 2, in which the end 6 is not disposed more than four or five meters below the surface 32. From this rest position, it is possible to lighten all or some of the floats 17, for example in the manner indicated above in connection with FIGS. 4 and 5, so as to bring the pipeline section 16 into a position in which the front end 6 is located practically on the surface, so as to allow it to be welded easily to the rear end of a further pipeline section as will be described hereinafter with reference to FIG. 6.

In the case of bad weather or if a storm is forecast, the pipeline laying operations are stopped, and to protect the end portion 16 against the effects of the sea, the floats 17 may be weighted, for example in the manner indicated above with regard to FIGS. 4 and 5, in order to bring the section 16 into the fall back position shown in FIG. 7. In this position, the end 6 is located at a sufficient depth, for example of fifteen meters or more, below the surface 32, as not to risk being damaged by the swell. One can also, when the bad weather forecast is not very severe, simply pull on the towing cable 2 by means of the tug 3 in order to bring the pipeline section back into the towing position (FIG. 1), or even attached to the end 6 a cable 33 and pull thereon by means of the tug, then fix the cable 2 or 33 to a dead weight not shown, until it is possible to resume the pipeline laying operations. It is also possible to use these means together, i.e., to weight the floats and pull on the cable or cables.

It has been stated above that the suspenders 18 and the portion of cable 30 produce a trail-rope effect in the towing position (FIG. 1). This effect is still more apparent in the rest positions (shown in broken lines in FIG. 2) and the folded position (FIG. 7). The weights of the suspenders and of the portion of cable 30 are selected as a function of the buoyancy conferred by the floats 17 on the pipeline section 16, so as to maintain the latter in stable equilibrium in the various positions shown, in order that there is no risk of it deteriorating due to excessive flexing. In the embodiment shown, the suspenders 18 are metal cables as the tow-line 2 and the portion 30 thereof but, according to other embodiments, the suspenders and/or the portion 30 of the towline could consist of chains, articulated metal rods or bars, or any other equivalent arrangement.

The rear end portion 34 of the pipeline section 1 (FIGS. 1 to 3) is equipped with floats 35 and suspenders 36 similar respectively to the floats 17 and suspenders 18 of the front end portion 16. The suspenders 36 are attached to the portion 37 of the holding cable 9 and form therewith a system of trail-ropes which co-operates with the floats in order to maintain the portion 34 of the pipeline in stable equilibrium. The latter can be brought from the towing position (shown in FIG. 1 and in full lines in FIG. 3) into the rest position (shown in broken lines in FIG. 3), into a joining position (FIG. 6) or into a fall back position by means similar to those described above for the portion 16. It may be pointed out, however, that the holding cable 9 is subjected to an effort much smaller than the towing cable 2 and can be much lighter than the latter. It is therefore necessary to keep the portion of cable 37 on the bed, by means of the drag 11, so that it can function as a trail-rope. However, this drag should not be too heavy so that its rubbing on the bottom does not risk preventing the portion 34 of the pipeline from rising to the rest position (shown in broken lines in FIG. 3) as soon as one ceases applying a holding force to the cable 9, and then rising into the joining position (FIG. 6) when the floats are lightened.

The pipeline section 1 is brought, by means of tugs 3 and 10, into a position in which its rear end portion 34 in which it is approximately an extension of the front end portion 16a of a similar previously laid pipeline section 16a (FIG. 6), and in which the rear end 8 of the pipeline section 1 is adjacent the front end 6a of the pipeline section 1a. The floats 35 and 17a are then lightened in the manner already described so as to bring the ends 8 and 6a to or very near the surface, and the two ends welded together. The floats are then progressively weighted by the means described with reference to FIGS. 4 and 5 so as to cause the joined ends 34 and 16a to sink until they rest lightly on the bed. Finally, the pyrotechnic rupturing devices 20 (FIGS. 4 and 5) are actuated so as to free the hoops 19. The pipeline being thus freed from floats and suspenders, it is sufficient to send down divers to free the collars 4 and 7 in order to recover the cables, the suspenders and the floats 17 and 35. One can cause the principal portion 13 of the pipeline to stay resting on the bed by freeing, by similar means, the floats 14 and recovering them together with the trail-ropes 15.

Referring again to FIG. 2, it may be noted that a relatively short sliding of the cable 2 on the bed allows a relatively large ascent of the end 6 of the pipeline section. In effect, the height of ascent of each suspender 18 can be assimilated to the deflection 38 of an arc 39 formed by the cable 2 between this suspender and the adjacent suspender in the position shown in broken lines, while the sliding of the cable produced by the curvature of this arc 39 is equal only to the difference between the initial distance d between these two suspenders and the length of the chord 40 of this arc, a difference which is very small for arcs of slight curvature. It can also be seen from FIG. 2 that the distance of sliding of the cable 2 on the bed is only 60 to 70% of the ascent of the end 6 of the pipeline section 1. Normally, the rubbing of the cable on the bed should not therefore prevent the ascent of the end 6.

However, it can happen, especially if the trail-ropes 15 are very heavy in order to prevent the pipeline section deviating under the action of strong transverse currents, that one is obliged to use an equally robust towing cable 2 which is so heavy that its rubbing on the bed would prevent the end portion of the pipeline section, connected to the cable by the suspenders, from rising towards the surface. One could then use the arrangement shown in FIG. 8 in which the members playing the same part as in the previous figures are designated by the same reference plus 100. In this figure, the suspenders 18 are replaced by cables 118 which are not connected to the towing cable 102 and the ends of which trail on the bed 112, thus forming trail-ropes, and the end 106 of the pipeline section 101 is fixed to a cable 133 which is connected to the tug 103 in parallel with the towing cable 102. There is no risk of these two cables becoming entangled if one takes the precaution of stretching them properly. In the embodiment shown, the floats 117 are moreover of the "crayon" type, i.e. in the form of cylinders connected by lines 117a to the portion 116 of the pipeline and maintained near to the surface 132 or extending through said surface. This arrangement makes it possible to lighten and weight the floats as required from the surface of the sea, for example by means of a boat carrying bottles of compressed air. The portion 116 of the pipeline is provided in various places with collars 117b to which are fixed the lines 117a and the trail-ropes 118. The pulling cable 133 is fixed to the collar 117b nearest to the front end 106 of the pipeline section.

The rear end portion (not shown) of the pipeline section 101 can be equipped either in the manner shown in FIG. 3 or with floats and trail-ropes similar to the trail-ropes 118.

Towing and joining of the pipeline section 101 are effected as described with reference to the preceding figures. The depth of immersion of the end 106 can be regulated by varying the tension of the pulling cable 133 and/or by varying the buoyancy of some at least of the floats 117, for example with the aid of the boat referred to above. Here again, one can also bring the end portion 116 into the joining position or into a fall back position if a storm is forecast. In the fall back position, the end portion of the pipeline will advantageously be immersed at a greater depth than in the preceding figures in order to bring the floats 117 to a depth of calm water.

However, it goes without saying that the trail-ropes 118 could equally well be associated with floats of a type different from the floats 117, for example with floats similar to those described with reference to FIGS. 4 and 5; it is then obviously sufficient to immerse the section 116 of the pipeline, in the fall back position, at a depth of calm water. Whatever type of floats used, the trail-ropes 118, or at least one or more thereof that are nearest to the end 106, are preferably less heavy in their lower end portions than in those which serve to maintain the system in stable equilibrium in the towing and fall back positions, so that the floats do not need to be lightened too much for raising the end 106 of the pipeline to the surface. In other words, the weight per meter length of the lower end portions of the trail-ropes 118 should preferably be smaller than the weight per meter length of the portions which alternately touch and leave the bed in the towing and fall back positions of the pipeline section 116.

FIG. 9, in which the elements playing the same part as in FIGS. 1 to 7 are designated by the same reference numerals with the addition of 200, illustrates an embodiment in which the towing cable 202, instead of hauling the pipeline section 201 by pulling on a traction head, extends right along the pipeline section and is connected to the principal portion 213 thereof at a plurality of points by means of suspenders 215. The pulling effort applied to the pipeline section is thus distributed among the suspenders 215 which reduces considerably the pulling strains to which they are subjected. In the embodiment shown, the suspenders 215 are fixed, not directly to the pipeline section, but to hoops 219 of the floats 214 by means similar to those shown in FIGS. 4 and 5. In the rear part (not shown) of the pipeline section, the cable 202 extends rearwards as far as a drag similar to the block 11 of FIGS. 1 to 3, and as far as a holding device similar to the tub 10. The suspenders 215 and the portions of the cable 202 to which they are attached form a system of trail-ropes similar to that described above with reference to FIG. 2, and co-operate with the floats 214 to maintain the principal section 213 of the pipeline section in stable equilibrium above the bed 212.

The front end portion 216 of the pipeline section is equipped in the manner described above with reference to FIGS. 1 to 7, and the rear end portion (not shown) is advantageously equipped in the same manner. Towing and joining of the pipeline section 201 are effected in the manner described with reference to FIGS. 1 to 7.

It goes without saying that the embodiments described are only examples and could be modified, notably by the substitution of technical equivalents or the combination inter se in various ways, without departing from the scope of the invention. For example, the front and/or rear end portion of the pipeline section could be equipped both with the suspenders 18 and the trail-ropes 118.

One would also not depart from the scope of the invention by replacing the tugs by other hauling devices.

I claim:

1. A method of laying a pipeline on the sea bed, comprising the steps of:
   (a) towing a first pipeline section from a shore towards the open sea while maintaining a front end portion of the first pipeline section near the surface of the sea,
   (b) preparing a second pipeline section ashore and towing the second pipeline section towards the open sea past the first pipeline section, while maintaining front and rear end portions of the second pipeline section near the surface of the sea and supporting a length of the second pipeline section intermediate said end portions on the sea bed,
   (c) joining the rear end of the second pipeline section to the front end of the first pipeline section, and
   (d) allowing the joined ends to descend to the sea bed.

2. A method of laying a pipeline on the sea bed, comprising the steps of:
   (a) towing a first pipeline section from a shore towards the open sea while making a front end portion of the first pipeline section buoyant to maintain a front end of the first pipeline section near the surface of the sea,
   (b) preparing a second pipeline section ashore and towing the second pipeline section towards the open sea past the first pipeline section, while making front and rear end portions of the second pipeline section buoyant to maintain front and rear ends of the second pipeline section near the surface of the sea, and while giving a length of the second pipeline section intermediate said end portions a negative buoyancy to support the same on the sea bed,
   (c) joining the rear end of the second pipeline section to the front end of the first pipeline section, and
   (d) ballasting said front end portion of the first pipeline section and said rear end portion of the second pipeline section to rest the same on the sea bed.

3. A method as claimed in claim 2, wherein the towing step includes exerting a pulling force at a point spaced from the front end of the second pipeline section, and exerting a holding force at a point spaced from the rear end.

4. A method as claimed in claim 2, wherein the joining step includes causing said front and rear ends to rise to the surface of the sea, and welding said front and rear ends together.

5. A method as claimed in claim 2, comprising, after the towing step and before the joining step, the further step of driving said end portions down to a fall back position to protect said end portions against the effects of a storm, and then rising said end portions again.

* * * * *